(12) United States Patent
Singhal et al.

(10) Patent No.: US 11,503,115 B2
(45) Date of Patent: Nov. 15, 2022

(54) MARKER BASED REPORTING SYSTEM FOR HYBRID CONTENT DELIVERY NETWORK AND PEER TO PEER NETWORK

(71) Applicant: Akamai Technologies, Inc., Cambridge, MA (US)

(72) Inventors: Rahul Singhal, San Carlos, CA (US); Eric K. Geyer, Oakland, CA (US); Henning Makholm, Rodovre (DK); Christian Worm Mortensen, Copenhagen (DK)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/138,713

(22) Filed: Dec. 30, 2020

(65) Prior Publication Data

US 2021/0194954 A1 Jun. 24, 2021

Related U.S. Application Data

(63) Continuation of application No. 15/709,598, filed on Sep. 20, 2017, now Pat. No. 10,887,385.

(51) Int. Cl.
| | |
|---|---|
| *H04L 29/08* | (2006.01) |
| *H04N 21/83* | (2011.01) |
| *H04L 67/1087* | (2022.01) |
| *H04L 67/104* | (2022.01) |
| *H04N 21/20* | (2011.01) |
| *H04L 5/00* | (2006.01) |
| *H04L 67/02* | (2022.01) |
| *H04L 67/1097* | (2022.01) |
| *H04L 65/612* | (2022.05) |
| *H04L 67/01* | (2022.01) |

(Continued)

(52) U.S. Cl.
CPC .......... *H04L 67/1091* (2013.01); *H04L 5/003* (2013.01); *H04L 65/612* (2022.05); *H04L 67/01* (2022.05); *H04L 67/02* (2013.01); *H04L 67/104* (2013.01); *H04L 67/1097* (2013.01); *H04L 67/51* (2022.05); *H04L 67/564* (2022.05); *H04N 21/20* (2013.01); *H04N 21/83* (2013.01)

(58) Field of Classification Search
CPC . H04L 67/1091; H04L 5/003; H04L 65/4084; H04L 67/02; H04L 67/104; H04L 67/1097; H04L 67/16; H04L 67/2819; H04L 67/42; H04N 21/20; H04N 21/83; (Continued)

(56) References Cited

U.S. PATENT DOCUMENTS 10,567,462 B2 *  2/2020  Mueller .............. H04L 65/80
10,887,385 B2    1/2021  Singhal
(Continued)

OTHER PUBLICATIONS

IEEE, Context-oriented Opportunistic Cloud Offload Processing for Energy Conservation in Wireless Devices, pp. 24-30, 2014, URL retrieved via: https://ieeexplore.ieee.org/stamp/stamp.jsp?tp=&arnumber=7063380 (Year: 2014).*

(Continued)

*Primary Examiner* — Schquita D Goodwin

(57) ABSTRACT

This document describes marker based approaches for a CDN to monitor and report on the amount of traffic that it is serving on behalf of content providers. They are particularly useful in hybrid delivery scenarios. Hybrid delivery scenarios means that a client may obtain content, such as a given multimedia stream, from one or more servers in the CDN, or from one or more peers in a peer to peer network. The amount of data served from the peer network is referred to herein as the "offload", as delivery of that data has been offloaded from the CDN platform.

14 Claims, 4 Drawing Sheets

(51) Int. Cl.
  *H04L 67/51*    (2022.01)
  *H04L 67/564*   (2022.01)
(58) Field of Classification Search
  CPC ............. H04N 21/632; H04N 21/8455; H04N 21/8456
  USPC ....................................................... 709/218
  See application file for complete search history.

(56)           References Cited

U.S. PATENT DOCUMENTS

| | | | |
|---|---|---|---|
| 2015/0365491 A1* | 12/2015 | Chan | H04N 21/4335 709/219 |
| 2016/0057185 A1* | 2/2016 | Zhang | H04L 65/608 709/231 |
| 2016/0119250 A1* | 4/2016 | Girard | H04L 47/803 709/226 |
| 2017/0034201 A1* | 2/2017 | Zaw | H04L 67/02 |
| 2017/0237657 A1* | 8/2017 | Rath | H04L 67/1097 709/238 |
| 2018/0349458 A1* | 12/2018 | Guirguis | G06F 16/273 |
| 2019/0098367 A1* | 3/2019 | Jung | H04L 65/4092 |
| 2020/0120452 A1* | 4/2020 | Lohmar | H04W 72/005 |

OTHER PUBLICATIONS

U.S. Appl. No. 15/709,598, filed Sep. 20, 2017.
"Communication Under MPEP § 609.02", transmittal letter submitted with this SB/08 form, Dec. 30, 2020, 1 page.

* cited by examiner

MARKER BASED REPORTING SYSTEM FOR HYBRID CONTENT DELIVERY NETWORK AND PEER TO PEER NETWORK

BACKGROUND

Technical Field

This application relates generally to content delivery networks, to peer to peer systems and to the delivery of streaming media and other content to users over computer networks.

Brief Description of the Related Art

It is known in the art to use a content delivery network ("CDN") in conjunction with a peer to peer ("P2P") system to deliver content to end users. For example, U.S. Pat. No. 8,332,484, the contents of which are hereby incorporated by reference in their entirety and for all purposes, describes a hybrid CDN-P2P delivery system. That patent describes (among other things) a system in which one or more peer machines become associated with the CDN, and the CDN's request routing system is then used to enable a given peer to locate another peer in the P2P network and/or a CDN server. Using this hybrid approach, CDN customer content may be delivered from the CDN server network, from the P2P network, or from both networks. In one embodiment, customer content is uploaded to the CDN and stored in the CDN's edge network, or in a storage network associated therewith. The CDN's edge network is then used to prime the P2P network, which may be used to take over some of the content delivery requirements for the customer content. The decision of whether to use edge network or peer network resources for delivery may be based on load and traffic conditions, and can be on a file by file, segment by segment basis.

Such systems are particularly useful for the delivery of live and video on demand multimedia streams, as well as large file downloads (e.g., software updates). Such systems may be used to support HTTP segmented streaming, in which a client requests "chunks" of data making up the stream; each chunk is a segment and is a file or byte range in the overall stream that provides the multimedia data for some time period in the overall stream. Note that in some formats, segments are referred to as fragments (e.g., a "fragmented" streaming format).

In a hybrid CDN-P2P system, it is sometimes necessary and often useful to determine the amount of offload that is being provided by the P2P network to the CDN. This means that the amount of offload is indicated by a point-in-time measure of the amount of data delivery being provided by the peers that would otherwise be served by the the CDN's servers.

It is particularly useful to be able to quickly, and with reasonable or bounded accuracy, report offload information to other CDN components. For example, offload may be useful for internal status and health monitoring purposes of a CDN, for customer user interface displays, for billing, and/or understanding and predicting load and capacity for load balancing and traffic management purposes within the CDN.

Reporting on traffic in a CDN-P2P system is known in the art. For example, it is known in the art by others to configure a client device to report to a control system for the P2P network on how much data it obtained from peers. It is likewise known in the art by others to require clients to obtain information about each file, multimedia stream segment before contacting peers. See, e.g., M. Zhao et al., "Peer-Assisted Content Distribution in Akamai NetSession", IMC '13 October 23-25, Barcelona, Spain, pp. 31-42, available from ACM; P. Aditya et al., "Reliable Client Accounting for P2P Infrastructure Hybrids", In Proc. NSDI, April 2012. Such requirement enables the CDN-P2P system to authorize the use of P2P on a file by file, or segment by segment, basis. It also enables the CDN servers to act as an independent source of data about a download so that misreporting by clients can be better identified. The requirement means that a client should contact a CDN server at least once per file/segment and download at least some data about the file/segment, or some portion thereof. Of course, the CDN servers can then report on how much data they served (e.g., via server logs). Both the client reports and server reports can be correlated in a back-end system to determine an offload measures for billing, customer displays, or the like. However, this approach requires reliance on the client, and requires waiting for reports from both server and client, which take too long for load balancing purposes in a distributed computing system. It would be beneficial to have an approach in which a server can rapidly and independently determine offload that is occurring at a given time, for given piece of content.

The teachings hereof provide techniques for a server to rapidly determine offload in hybrid CDN-P2P systems. The teachings herein address also provide other benefits and improvements that will become apparent in view of this disclosure.

A general background on CDNs is now provided.

A "content delivery network" or "CDN" is often operated and managed by a service provider. The service provider typically provides the content delivery service on behalf of third parties. A distributed system of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, e.g., the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN's components may be located at nodes that are publicly-routable on the Internet, within or adjacent nodes that are located in mobile networks, in or adjacent enterprise-based private networks, or in any combination thereof.

In a known system such as that shown in FIG. 1, a distributed computer system 100 is configured as a content delivery network (CDN) and has a set of computer machines 102 distributed around the Internet. Typically, most of the machines are configured as servers and located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the servers (which are sometimes referred to as content servers, or sometimes as "edge" servers in light of the possibility that they are near an "edge" of the Internet). Such servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End user client devices 122 that desire such content may be directed to the distributed computer system to obtain that content more reliably and efficiently. The CDN servers 102 respond to the client device requests, for example by obtaining requested content from a local cache, from another CDN server 102, from the origin server 106, or other source.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN, and which acts as a request routing mechanism to direct clients to a selected CDN server 102. A distributed data transport mechanism 120 may be used to distribute control information (sometimes referred to as "metadata") to the CDN servers via staging 121.

A more detailed illustration of an embodiment of a CDN server 102 is provided in FIG. 2. As illustrated in FIG. 2, a given machine 200 in the CDN comprises commodity hardware (e.g., a microprocessor) 202 running an operating system kernel (such as Linux® or variant) 204 that supports one or more applications 206a-n. To facilitate content delivery services, for example, given machines typically run a set of applications, such as an HTTP (web) proxy server 207, a name service 208, a local monitoring process 210, a distributed data collection process 212, and the like. The HTTP proxy server 207 (sometimes referred to herein as a HTTP proxy for short) is a kind of web server and it typically includes a manager process for managing a local cache and delivery of content from the machine. For streaming media, the machine may include one or more media servers, as required by the supported media formats.

A CDN server 102 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (again sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

Preferably, the CDN operates a DNS infrastructure to route client requests (i.e., request routing service) to a selected CDN server 102. In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN domain name service returns one or more IP addresses (via consultation with the mapmaker shown in FIG. 1). The requesting client application (e.g., a web browser) then makes a content request (e.g., via HTTP or HTTPS) to a CDN server 102 associated with the IP address. The request includes a host header that includes the original content provider domain or sub-domain. Upon receipt of the request with the host header, the CDN server 102 checks its configuration file to determine whether the content domain or sub-domain requested is actually being handled by the CDN. If so, the CDN server 102 applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server 102 should use when processing that request.

A CDN may have a variety of other features and adjunct components. For example the CDN may include a network storage subsystem (sometimes referred to as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

SUMMARY

This document describes marker based techniques for a delivery platform such as a CDN to monitor and report on the amount of traffic that it is serving on behalf of content providers. The techniques are particularly useful in hybrid CDN-P2P delivery scenarios. Hybrid delivery scenarios means that a client device may obtain data for a given piece of content or from one or more peers in the P2P network. The amount of data served from peers in the peer network is referred to herein as the "offload", because delivery of that data has been offloaded from the CDN platform. A CDN may decide to charge a reduced or otherwise different rate for delivery via such offloaded mechanism. The case where content is served only from a server in the CDN platform is referred to herein as the "unicast" scenario, to contrast it with the peer delivery scenario.

Preferably, the marker based system enables a given CDN server to rapidly calculate the amount of proportion of data being offloaded to the peer network for a given stream. The accuracy of the calculation can be tuned based on the marker system configuration.

Offload information can be used in many ways. One way is for billing a content provider at different rates for CDN server-delivered data compared to peer-delivered data. A second use is to provide essentially real-time measures of offload for purposes of system monitoring and maintenance (e.g., by CDN personnel) and/or customer reporting (e.g., via an online interface for the customer to view their traffic delivery characteristics, referred to as a portal).

Yet a third use relates to load management within a CDN for multimedia stream delivery, and it requires a dose of background to understand. The use of a hybrid CDN-P2P system presents a unique problem for load management in a CDN. Typically, a CDN operates a request routing mechanism (e.g., a DNS infrastructure, as was described above) in order to distribute client requests for content amongst the deployed CDN servers so as to balance load, lower cost, and provide low latency to clients, among others things. The request routing mechanism relies in part on feedback from the CDN servers themselves, i.e., CDN servers continually report the load that they are experiencing. (See U.S. Pat. Nos. 6,108,703 and 7,660,896, the contents of which are hereby incorporated by reference for all purposes.) When delivery of a multimedia stream is offloaded to a P2P network, the load reported by the CDN servers will drop. Nevertheless, the client has the option of returning to its originally assigned CDN server to get the content if and when the peers do not have the data, are not available, are farther from the client than the CDN, or for other reasons. Also, certain content may require the client to come back to the CDN, e.g., advertisements in the middle of a stream. If a substantial number of clients need to "return" to their CDN server for the multimedia stream, and the request routing system has in the meantime allocated capacity of that CDN server to serve other content and/or clients (in view of the temporarily reduced load), it is possible to overload the CDN server. This could result in poor performance for the returning client, or faults in the worst case. This problem is referred to herein as a "flashback" crowd.

The marker based reporting system described herein, and the P2P offload measurements they enable, can be used to mitigate the problem of flashback crowds. More specifically, CDN servers can report their current offload to the CDN's request routing system. The request routing system can then take into account the possibility that clients will return for the previously offloaded proportion of the multimedia stream. For example, it could assign only a fraction of the offloaded, newly available capacity to new traffic, keeping in reserve a particular amount of capacity in anticipation of a flashback crowd.

As those skilled in the art will recognize, the foregoing description merely refers to examples of the invention. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

Figure 1:
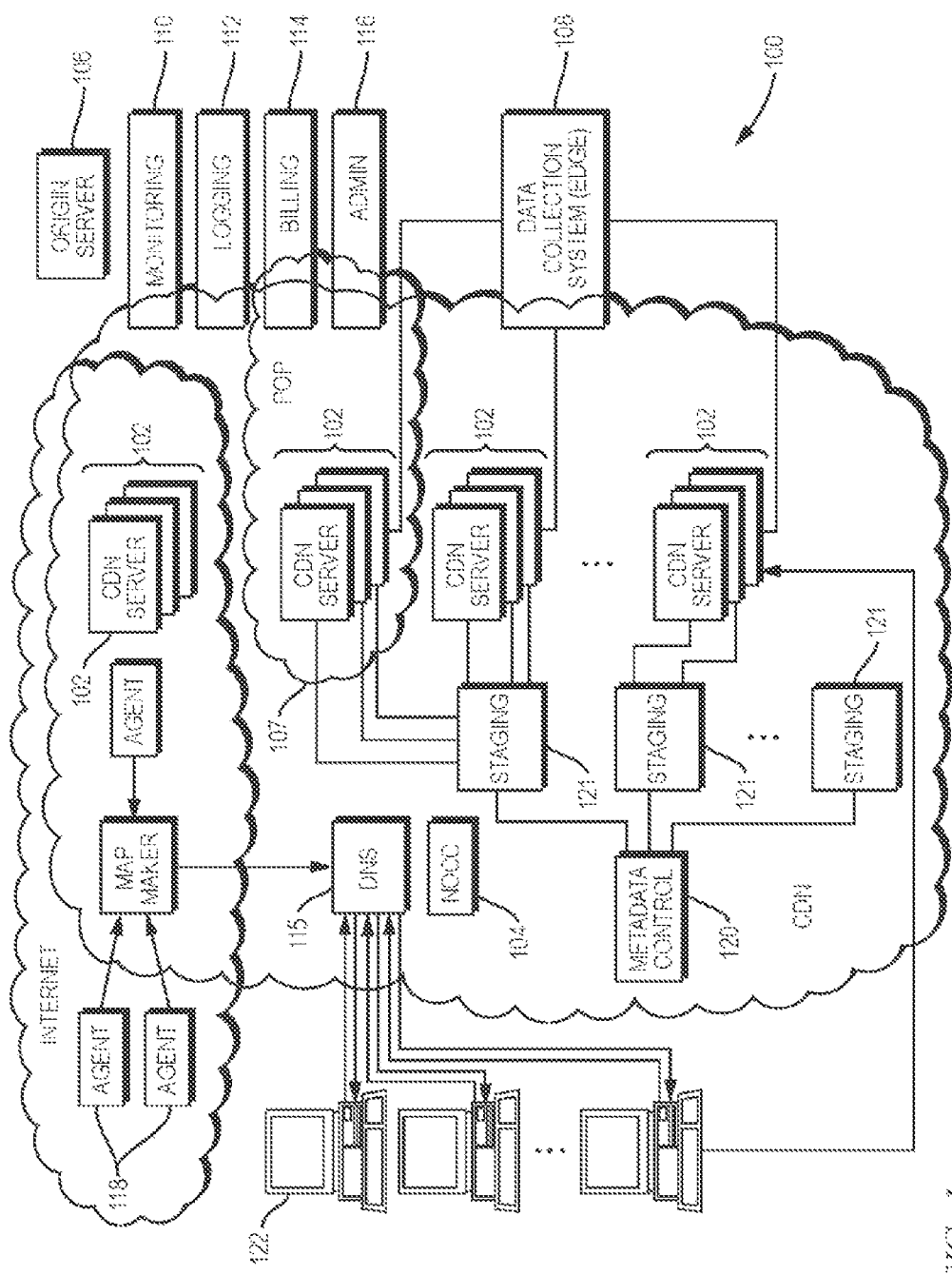
FIG. 1 is a schematic diagram illustrating one embodiment of a known distributed computer system configured as a CDN.
Figure 2:
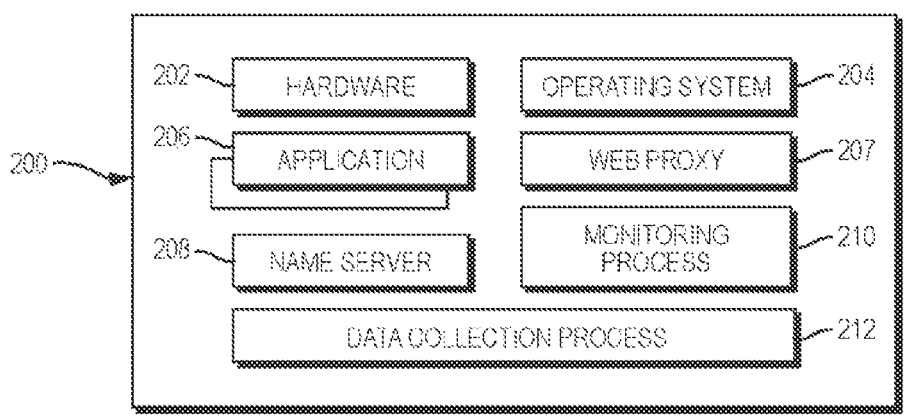
FIG. 2 is a schematic diagram illustrating one embodiment of a machine on which a CDN server in the system of FIG. 1 can be implemented.

The teachings hereof may be implemented in a web server and in particular in a CDN server 102, 200 of the type described with respect to FIGS. 1 and 2.

Marker Based Reporting System Architecture

In a preferred embodiment, the marker based reporting system (MBR system or MBRS) is run in a hybrid CDN-P2P system which has a plurality of CDN servers and which services a plurality of client devices, each client device running a special application that obtains multimedia content from either one of the CDN servers or from a peer, e.g., another player instance on another client device, and supports the the MBR system in the manner described herein. The application is referred to herein as the client player application or simply the player and may take the form of an application or a software development kit (SDK) from which such an application is built.

For convenience of description, this document refers to the MBRS functionality running on the CDN server as the server-side MBRS module, and the MBRS functionality running on the client side as the client-side MBRS module.

Figure 3:
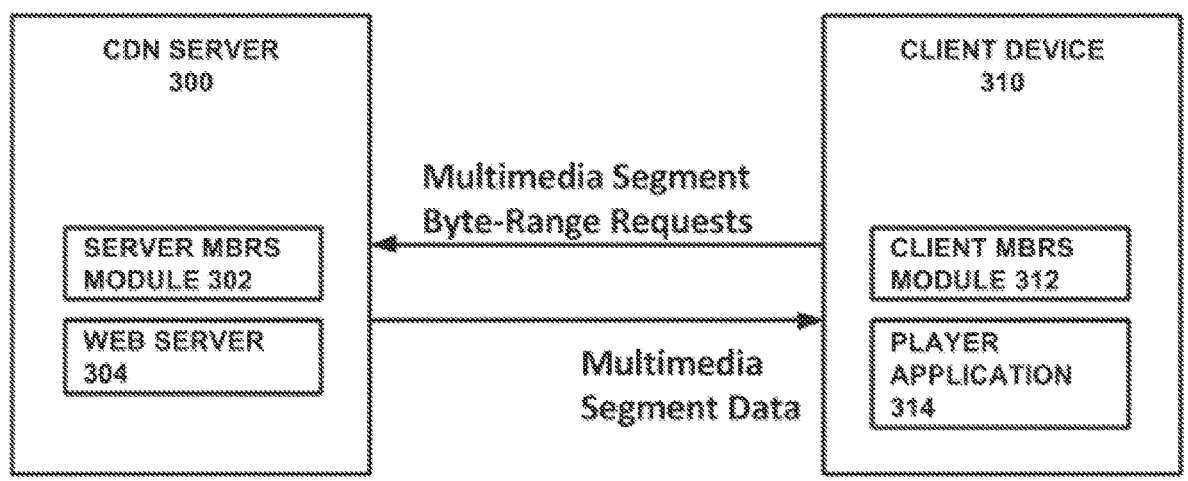
FIG. 3 is a schematic diagram of a CDN server and a client device as part of a marker based reporting system (MBRS)

FIG. 3 illustrates the system at a high level. The CDN server 300 (which again may be implemented by modifying the CDN server 102, 200 already described) has a web server 304 and a MBRS module 302 that examines the client requests and performs marker calculations as described herein. FIG. 3 is merely a logical illustration; the MBRS module may be incorporated into the code of the web server 304 itself.

FIG. 3 also depicts a client device 310 running a player application 314 and a client side MBRS module 312, the latter of which may be incorporated into the code of the player application itself.

The MBRS system requires client players to download at least a portion of multimedia data only from a CDN server, rather than a peer. These portions of the data are called markers. Markers preferably occur at defined intervals in the data and have defined sizes. Put another way, the markers are not shared using the peer delivery mechanism. All clients are programmed (via the module 312) to obtain marker bytes from a CDN server. Markers are essentially a virtual construct that is understood and implemented by MBRS-compatible clients and servers. Other client applications (i.e., that do not utilize the MBRS system) don't have a requirement to have any special behavior around markers. Such clients will simply request bytes in their normal ways. A CDN server will properly report that such clients have offload percentages of zero based on the fact that they read all the markers and all the non markers.

Figure 4:
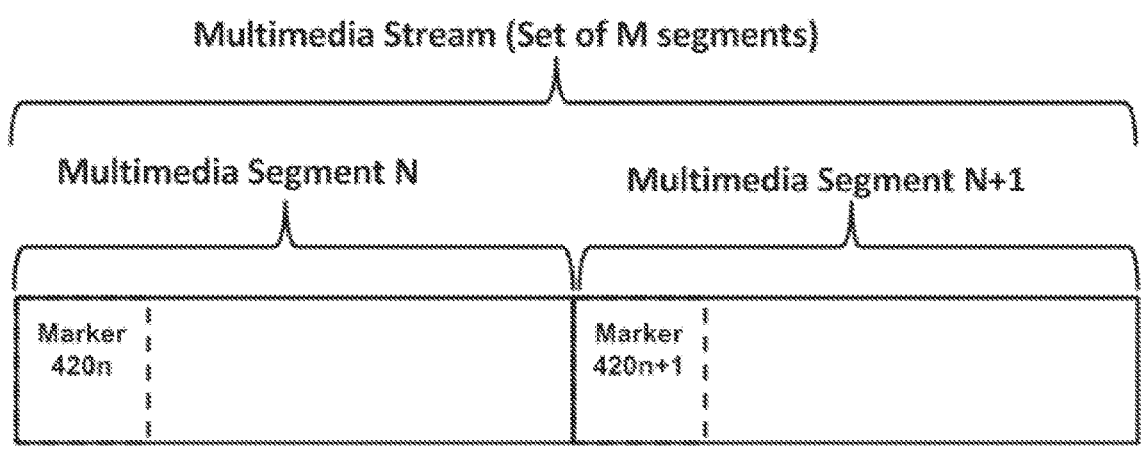
FIG. 4 is an example of multimedia segments with marker data designated therein; and, FIG. 5 is a block diagram illustrating hardware in a computer system that may be used to implement the teachings hereof.

FIG. 4 provides an example of what multimedia segments with marker data might look like. In this example, there are two segments 420N and 420N+1 in the multimedia stream, which has some larger number of segments M making up the presentation. The marker data is defined to be a portion of data (e.g., a byte range) at the beginning of each segment. Hence, the client side MBRS module 312 is tasked with determining, given a request from the player 314, where the requested data must be retrieved. If the requested data is for or contains marker data then the module 312 requests the marker data (or tells the player application 314 that the marker portion must be requested) from the CDN server 300. If there is no marker data, then it can be requested from either the server 300 or from a peer. The client may request marker and non-marker data in a single request, or split them across multiple requests. Note that the client is assumed to request each marker only once. The system uses a look-back approach, but only on per-segment basis. In other words, i.e., the approach is that if a client requests marker N, it is estimated that the client already downloaded the data between marker N and marker N−1. Hence, depending on how much of that data was requested from the CDN, the offload estimate can be made. Similarly, if the client downloads marker N−1, it is only estimated that the client downloaded the data between marker N−1 and N−2. This approach is useful to cover the circumstance where a client decides to seek to an arbitrary place in a stream based on commonly available trick play video functionality, such as skip/fast forward/chapter marking schemes.

The server side MBRS module 312 is tasked with determining whether and how much of a client device's 310 request is for marker data, how much is for non-marker data, and for determining the offload based on this and other information, as described in more detail below.

Example of MBRS Implementation

In one embodiment, the CDN server 300 runs the server-side MBRS module 302 as shown in FIG. 3A; the module is configured with certain out of band information (explained below) that enables it to identify which bytes ranges in a given multimedia stream are designated as marker bytes. When a client device 310 requests these byte ranges, the CDN server 300 (via the MBRS module) determines that they are marker bytes. (The client operates similarly, preferably storing identical out of band information so it can determine the location of the marker bytes). As indicated by the term "out of band", the actual multimedia data (e.g., shown in FIG. 4) itself does not necessarily, and preferably does not, contain a flag, label or other in-band indication of being a marker byte. Put another way, preferably the data in the multimedia stream itself is not altered in this implementation. Rather, the location of marker bytes are defined by distinct and independent out of band information. Of course, in some embodiments, it may be advantageous to annotate the multimedia stream with in-band marker designations, when practicing the technique described herein.

There are four inputs for a server or client-side MBRS module:
1) Marker interval (MI)—frequency in bytes that markers appear, default of 10 MB (2^20*10)
2) Marker 'Parts Per Million' (MPPM)—How large a marker is compared to the underlying data, default 30000 (3%). Generalizing, this value specifies the size of markers in ratio to the underlying data; it is not required to be 'per million'.
3) Marker Data Block Size (MBSZ)—The size of a block of marker data, default 8192B. This value determines how much marker data is requested from the server. Any size could be used.
4) Request byte range of the multimedia object (in the current example, the object is the segment) as specified in the incoming request. For the server side MBRS module 302, this would be the client's request. For the client side MBRS module 312, this would be the request from the player application.

The out of band information is the MI, MPPM, and MBSZ information in this example.

Markers appear at the beginning of a MI sized block of data. For segmented streams this means any segment under 10 MB will have a single marker at the start of the segment. The size of the marker is determined with this formula:

$$\text{Marker Size(MS)} = \min(\text{MSL}, \text{MBSZ} \times \text{ceil}(\text{MSL} \times \text{MPPM}/1{,}000{,}000/\text{MBSZ}))$$

where ceil is ceiling function which results in the least integer that is greater than or equal to the calculated result, and where MSL is the actual length of the marker section, which equals MI for all but the last marker section in the object.

MPPM is given in parts per million such that it is possible to specify a single block of marker data for every MI bytes by setting MPPM to 1. Specifying parts per thousand would be slightly too coarse for that. Floating point preferably is not used in these calculations. It is important that all MBRS participants (i.e., delivery-side modules, client side modules) in produce identical results for the marker size calculation. Rounding up to the nearest integer after the divisions is a simple, consistent way to make sure there is at least one marker block in each MI-sized block.

The above approach works well for offload cases of segmented streams (whether live or video on demand), large file video on demand (VOD) and full file downloads. For segmented data any segment less than 10 MB will have exactly one marker of at least 8192 bytes. In the unlikely case of a segment less than 8192 bytes the marker will be the full segment.

When a CDN server 300 receives an HTTP range request it examines the range(s) in the request. It calculates the location of the markers and determines the marker byte count (MBC) and the non-marker byte count (NMBC) in the request. The CDN server can then calculate the amount of data being offloaded and report these numbers to a local monitoring process, as follows:

Expected Data Size: min(MI, actual object size, MBC*(1,000,000/MPPM))

Actual Bytes Delivered: MBC+NMBC

The difference between Expected Data Size and the Actual Bytes Delivered represents the offloaded amount.

These numbers (i.e., the Expected Data Size and Actual Bytes Delivered) can be accumulated by a local monitoring process on the CDN server and used to produce estimates of data offload, and thus estimate the "unicast fallback size". The numbers can be reported to a remote and intermediate-tier monitoring process for accumulation across several CDN servers or across PoPs, i.e., such that an offload calculation can be performed taking into account the traffic across all of those servers or PoPs. In this way, the offload reporting for a particular stream can be accomplished even if a client issues requests for the same stream to different CDN servers. Ultimately the results can be relayed to a remote system, such as a request routing service, and/or a customer portal, for such purposes as outlined earlier.

In the case of a client that is downloading a full segment via unicast (i.e., without using the peer network), the expected data size and actual bytes delivered values would be equal. It is also possible to have a client request that requests no marker bytes to have an expected data size of zero coupled with a positive value of actual bytes delivered. For a request that downloads only markers the expected data size would be the full segment size or full marker interval size, whichever is smaller, and actual bytes delivered would be the size of the request.

Clients that are non-marker system aware may make range requests that span the marker boundary. In this case the MBC would be less than the full marker size. Generalizing, this embodiment is designed such that the system can handle requests of many forms, even from clients that are not implementing the marker system and yet measure and aggregate the above byte count numbers to produce an offload calculation. For example, the CDN servers might receive any of the following type of requests: (1) A full segment request for all marker and non-marker bytes; (2) An HTTP range request for a range in segment that includes only full or partial marker bytes for the segment (marker only request); (3) A range that requests only non-marker bytes; (4) An HTTP range request for range that has some portion of marker bytes and some portion of non-marker bytes.

The expected request pattern for multimedia segments is.
1) OPTIONS Preflight for Range requests (for Browser SDK only)
2) HEAD or equivalent to get content length for the segment.
3) GET: Marker+first non-marker chunk, compound range (0-MarkerEnd, XXX-YYY)
4) Any subsequent requests for non-marker data This would be a minimum of three requests/segment and a common case of at least four requests for segments less than MI size for a Browser SDK, two requests for an in-app SDK.

It should be understood by those skilled in the art that the teachings hereof are not limited to the specific formulas set forth above. In an alternate embodiment, the Expected Data Size could be calculated more accurately as Expected Data Size: min(MI, actual object size, MBC*MSL/MS); however, the formula given earlier is useful for situations in which the algorithm is run after MBC has been accumulated over many client requests.

It should also be understood that the teachings hereof are not limited to a marker block size or location. The client and server need to agree on the location and size of markers, preferably using the same mathematical functions to determine location and size. But marker blocks may be at the beginning, end or anywhere in a segment. Furthermore, variant implementations may employ marker sizes other than 8192 bytes, in accordance with the engineering requirements and goals of a particular project.

Offload Limitations and Reporting Scale

Requiring markers limits the offload potential of a CDN-P2P system by the size of the markers. In this implementation the default marker size is 3%. One can observe the behavior of the system in operation to see if the 3% value is appropriate. This percentage gives a 33.33× scale factor which means that small errors in marker download behavior can be multiplied significantly in the reporting. As the system is tuned in practice, it may be desirable to either increase or decrease the MPPM value.

Markers at Segment Start

Markers preferably start at the beginning of stream segments. This placement could cause load mis-reporting if a client reads the beginning of segments without reading the complete data. To address this, markers can be placed at other locations, e.g., alternatively or additionally at the end of segments. However, marker-size calculations may become more complex and more likely to have over-reporting and scaling issues, so such issues must be taken into account when doing so. It is preferable the the marker is a contiguous section of data. But that is not a limitation of the teachings hereof.

Markers and Proxies

In some cases, data that is designated as marker data may be cached in proxies between the CDN server and client devices. For example, clients not using the marker system will request full objects instead of ranges and that data can be cached by proxies. Further, those proxies may also serve the marker range requests from their caches. This should not have too great an effect on offload reporting because the same proxies will probably be able to serve most of the demand. This means that the proxies probably will mitigate the effect of any flashback crowd, so the offload reporting in effect will continue to be correct, i.e., in the case of a unicast fallback the proxy would offload the CDN server just like it would offload the markers. In the short term this issue is likely to only apply to traffic served via HTTP and some HTTPS traffic, mostly that in networks where intercept caches are deployed. In the future more HTTP/2 and QUIC traffic will be potentially intercepted as more middle boxes support those protocols.

Synchronized Marker Downloads

For live events, clients can start multimedia segments by downloading the marker data first. One might be concerned that this might cause a "pulsing" effect where all clients come back together for the same data window at the same time. Typically, however, clients are not truly synchronized even if they are all playing at the live point in a live event. They are spread over a window of time around the length of one or more segments of the stream. This is true for MBRS clients and non-MBRS clients. Any pulsing effect would be no different from a normal unicast streaming event in any case, except that the pulses will be smaller than for unicast events.

In essence, the first marker download warms the cache for subsequent client requests, which is a desirable behavior. A CDN server may promote the marker range to a full object HTTP 'get' when it goes forward. This means that when the CDN servers make a forward request to an origin server or a cache hierarchy parent server or other parent server, they will request the full object, rather than just the byte range of the object for which they received a client request. The CDN servers and any proxies will then have the full object (the segment) in a local memory (i.e., the local web cache, application memory, or otherwise) for subsequent ranges.

Potential Verification for Other Billing Data

Even if not used for billing content provider customers, markers can be reported in CDN server logs for upstream analysis. This means that they could be used as a comparison baseline for understanding if billing data for bits otherwise captured by the CDN-P2P system is accurate. Other capture mechanisms might include, for example, the clients reporting how much data they have obtained from peers and/or CDN servers. The marker data can thus serve as a verification of this data, as it is from untrusted clients.

Marker Security Considerations

Preferably, markers appear at the same place in the segment to all clients. A determined attacker will be able to identify the marker locations by either inspecting code or observing request patterns. The exact use and pattern of marker data would not be immediately obvious to attackers without a knowledge of the MBRS system, but one can also assume that this information will be discovered. Because markers are normal multimedia requests, they can be protected from basic re-use attacks by security tokens or any other mechanism that is used for normal requests.

A security concern for the marker implementation is that malicious clients could skew reporting by repeatedly downloading just the marker data. Some constraints on the offload calculations are thus preferable. For example, after they are calculated, the offload estimates can be constrained within maximum limits such as it can never be greater than the total computed marker size for any object.

There is also the possibility that malicious clients could share the marker data that is not intended to be shared by properly behaved clients. This is not a significant addition security risk since a client that does a unicast download already has the ability to share the full data it downloads.

Use of Offload Characteristics for Request Routing

As noted earlier, the offload information from CDN servers can be fed to a request routing system (e.g., a DNS system) for use in modifying load balancing algorithms. Particular load balancing algorithms are out of scope hereof and will be based on the particular system, desired load spread, and traffic patterns, but below is some context for how the offload information could be used.

As one example, the request routing system could perform a static capacity reservation. For this, using the marker system a CDN server can report how much traffic is being served directly to clients and an estimate based on markers of how much is being offloaded. This will allow the request routing system to make estimates for how much bitload is being delivered via peers and thus estimate how much extra capacity could be needed to handle a flash crowd. The request routing can assume that the load requirements for the flash crowd will scale at the same ratio as the traffic being served. It can then take these estimates and use them to reserve some amount of capacity in regions for traffic shifts.

This can be done statically, with fixed reservations or it can be done dynamically with reservations changing over time. For the case of traffic leaving and coming back, the request router could reserve some capacity for a short period of time when traffic disappears. This time period would be short, e.g., in a range of about 30 seconds, 60 seconds, 100 seconds, 300 seconds, 500 seconds, but preferably the exact period would depend on the length of advertisement breaks anticipated during an event. After some period the amount reserved would drop to zero quickly. This approach would leave some headroom for the return of traffic but not delay more than necessary.

Characteristics & Potential Benefits of System

Utilizing clients that understand and have special marker behaviors can yield several nice properties. For example:

1) One can measure the amount of data downloaded via markers and non-markers by all clients and accurately estimate the amount of data that is being offloaded in a peer group by marker-aware clients.
2) Measurements of direct delivery bytes and offload estimates can be made per-HTTP request, with no need to accumulate state across requests. Thus clients without any special marker behaviors will also contribute to offload estimates in a consistent way.
3) Marker aware clients do not share a portion of the data in the peering system, making it slightly more difficult for malicious clients to reconstruct the full data set if they don't have access to the direct download.
4) For multicast implementations, the marker data will not appear in the multicast channel making stream interception from multicast more difficult. This will allow the use the same MBRS to give the same offload estimates for multicast events.
5) It can provide a basis for segment-based authentication, since clients are not allowed to get all the data from peers. In other words, because a client will have to come to a CDN server for the marker content, the system may be set up to deny requests per each segment of the multimedia stream that is associated with a marker.

The foregoing are characteristics and potential benefits that may be achieved in certain embodiments of the invention; they should not be viewed as necessary to the practice of the invention.

It is noted that references to segmented streams are by way of example only and not meant to be limiting. The teachings hereof can be used in situations where a multimedia stream (or other data stream) is treated as a single object, with the client making byte range requests into that single object, and markets interspersed in that single object. The teachings hereof can also be used for large file downloads (e.g., such as software downloads).

Computer Based Implementation

The teachings hereof may be implemented with conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
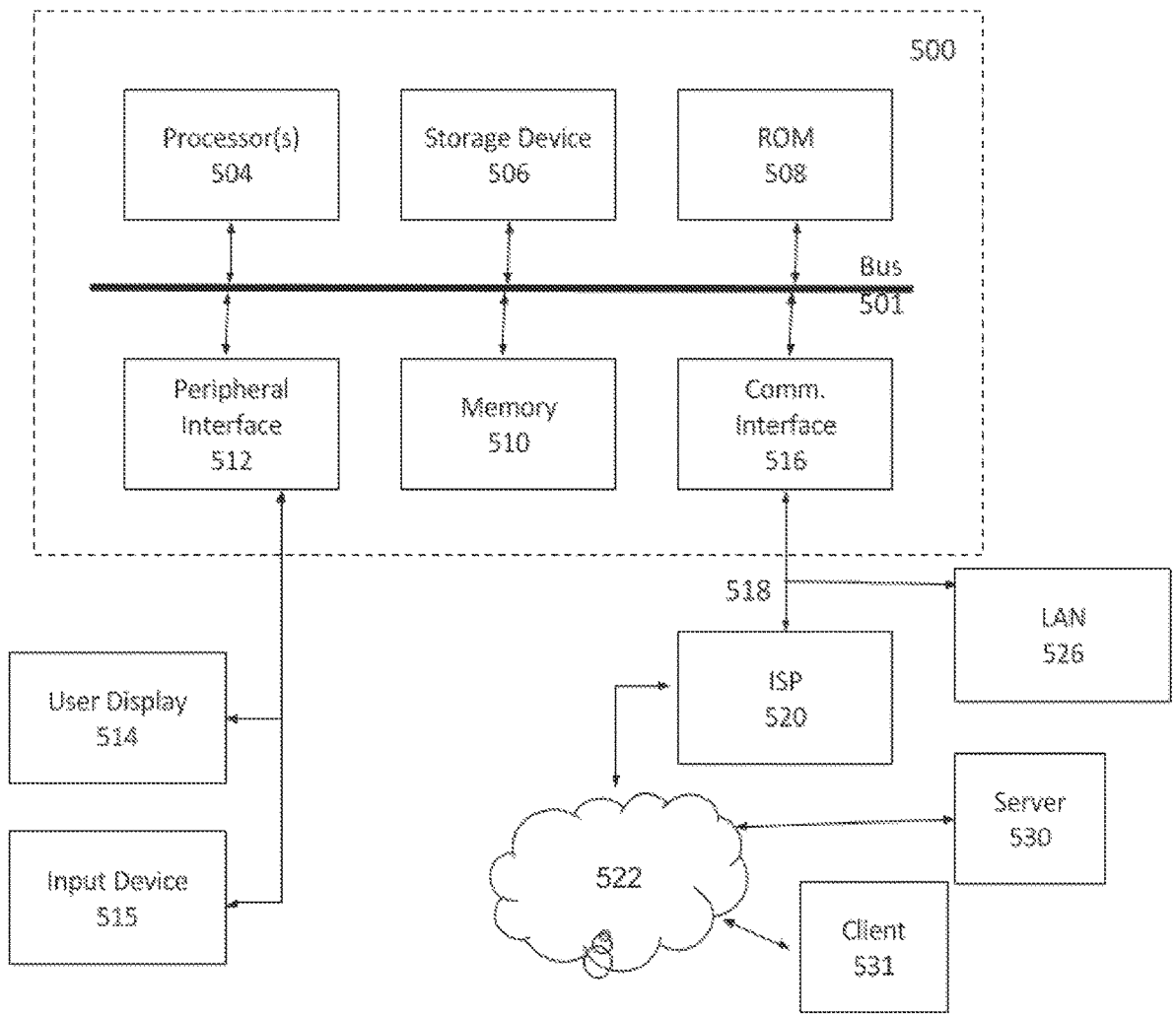

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer, or otherwise) between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method performed by a multimedia delivery system, the method comprising:
   delivering a multimedia stream to a client device, partially from one or more servers and partially from one or more peer devices distinct from the one or more servers;
   requiring the client device to request designated portions of the multimedia stream from the one or more servers, rather than the one or more peer devices;
   allowing the client device to request portions of the multimedia stream, other than the designated portions, without said requirement;
   receiving, at one of the one or more servers, a request from the client device for data in the multimedia stream;
   identifying how much of the data in the request from the client device corresponds to the designated portions;
   based at least in part on said identifying, estimating offload for the multimedia stream, the estimated offload reflecting an amount of data in the multimedia stream delivered to the client device from the peer devices relative to an amount of data in the multimedia stream delivered to the client device from the one or more servers; and,
   applying the estimated offload in performing at least one of:
      (i) monitoring of the multimedia delivery system,
      (ii) offload reporting to a content provider that provides the multimedia stream, and
      (iii) managing load in the multimedia delivery system.

2. The method of claim 1, wherein the estimated offload comprises a real-time offload measure.

3. The method of claim 1, comprising applying the estimated offload in performing:
   (i) monitoring of the multimedia delivery system.

4. The method of claim 1, comprising applying the estimated offload in performing:

(ii) offload reporting to a content provider that provides the multimedia stream.

5. The method of claim 1, comprising applying the estimated offload in performing:

(iii) managing load in the multimedia delivery system.

6. The method of claim 1, further comprising adjusting a routing of requests from client devices to the one or more servers, based at least in part on the estimated offload.

7. The method of claim 1, wherein the designated portions are designated in accord with the following formula:

Marker Size(MS)=min(MSL,MBSZ×ceil(MSL× MPPM/1,000,000/MBSZ))

where: ceil is a ceiling function, MSL is an actual length of a marker section, MPPM is a marker parts per million ratio, and MBSZ is a size for a block of marker data.

8. A multimedia delivery system, comprising:

A. one or more servers;

B. one or more peer devices distinct from the one or more servers;

C. a client device comprising at least one hardware processor and memory storing a player defined by computer readable instructions for execution on the at least one hardware processor, the player comprising computer readable instructions to:

request a multimedia stream partially from the one or more servers and partially from the one or more peer devices;

require the client device to request designated portions of the multimedia stream from the one or more servers, rather than the one or more peer devices;

allow the client device to request portions of the multimedia stream, other than the designated portions, without said requirement;

send a request for data in the multimedia stream to one of the one or more servers;

D. the one of the one or more servers comprising at least one hardware processor and memory storing computer readable instructions for execution on the at least one hardware processor to:

receive the request from the client device for data in the multimedia stream;

identify how much of the data in the request from the client device corresponds to the designated portions;

based at least in part on said identifying, estimate offload for the multimedia stream, the estimated offload reflecting an amount of data in the multimedia stream delivered to the client device from the peer devices relative to an amount of data in the multimedia stream delivered to the client device from the one or more servers; and, E. the multimedia delivery system comprising at least one hardware processor and memory storing computer readable instructions for execution on the at least one hardware processor to:

apply the estimated offload in performing at least one of:

(i) monitoring of the multimedia delivery system, (ii) offload reporting to a content provider that provides the multimedia stream, and (iii) managing load in the multimedia delivery system.

9. The multimedia delivery system of claim 8, wherein the estimated offload comprises a real-time offload measure.

10. The multimedia delivery system of claim 8, wherein applying the estimated offload comprises:

(i) monitoring of the multimedia delivery system.

11. The multimedia delivery system of claim 8, wherein applying the estimated offload comprises:

(ii) offload reporting to a content provider that provides the multimedia stream.

12. The multimedia delivery system of claim 8, wherein applying the estimated offload comprises:

(iii) managing load in the multimedia delivery system.

13. The multimedia delivery system of claim 8, wherein applying the estimated offload comprises: adjusting a routing of requests from client devices to the one or more servers, based at least in part on the estimated offload.

14. The multimedia delivery system of claim 8, wherein the designated portions are designated in accord with the following formula:

Marker Size(MS)=min(MSL,MBSZ×ceil(MSL× MPPM/1,000,000/MBSZ))

where: ceil is a ceiling function, MSL is an actual length of a marker section, MPPM is a marker parts per million ratio, and MBSZ is a size for a block of marker data.

* * * * *